UNITED STATES PATENT OFFICE.

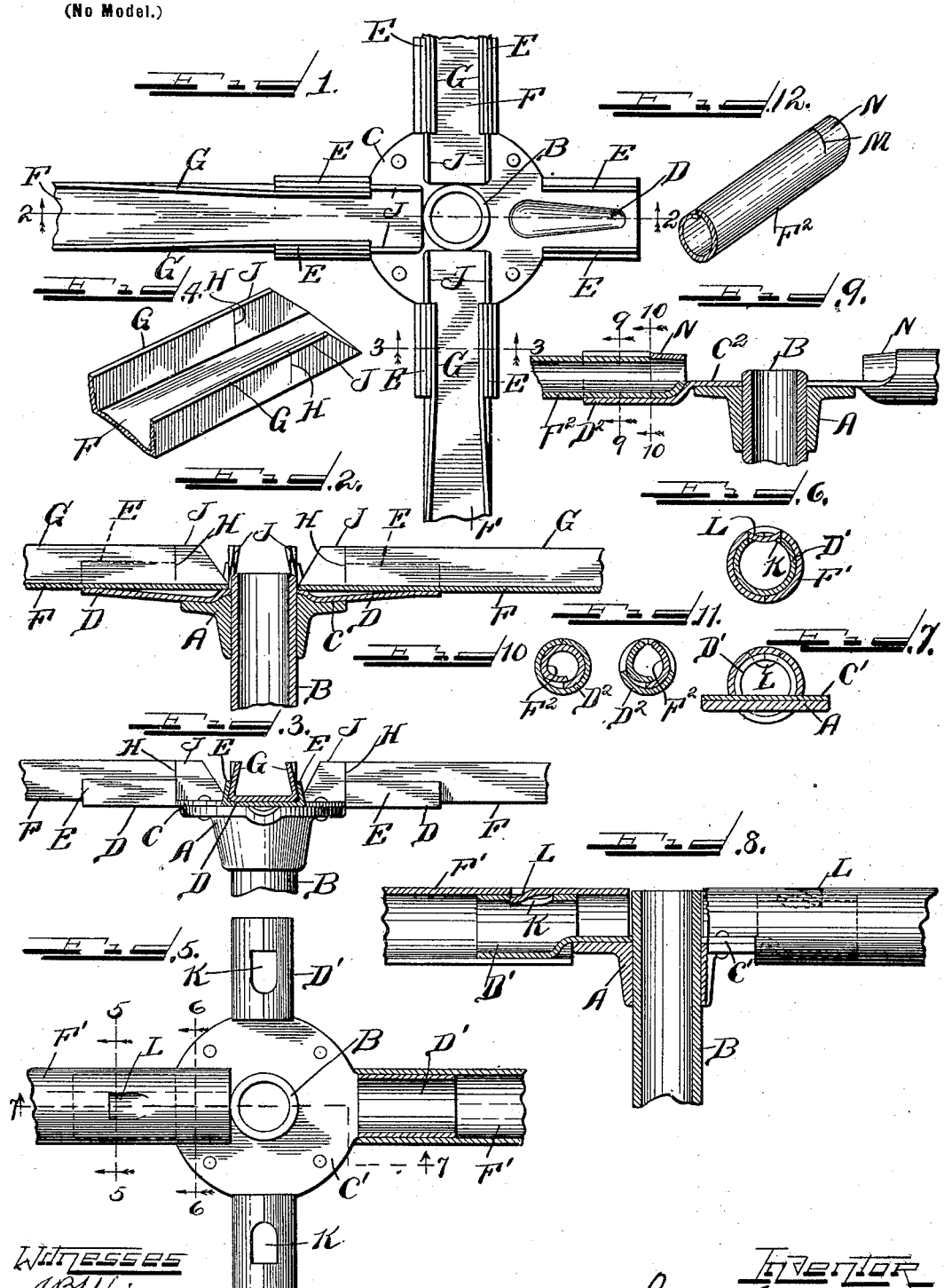

JAMES MACPHAIL, OF BLUE ISLAND, ILLINOIS, ASSIGNOR TO McCORMICK HARVESTING MACHINE COMPANY, OF CHICAGO, ILLINOIS, A CORPORATION OF ILLINOIS.

MEANS FOR ATTACHING SPOKES, REEL-ARMS, SPIDER-ARMS, OR THE LIKE TO HUBS.

SPECIFICATION forming part of Letters Patent No. 686,823, dated November 19, 1901.

Application filed April 27, 1901. Serial No. 57,691. (No model.)

*To all whom it may concern:*

Be it known that I, JAMES MACPHAIL, a citizen of the United States, residing at Blue Island, in the county of Cook and State of Illinois, have invented a new and useful Means for Attaching Spokes, Reel-Arms, Spider-Arms, or the Like to Hubs, of which the following is a specification.

This invention relates to means for attaching spokes, reel-arms, spider-arms, and the like to hubs.

The object of the invention is to provide means which are simple, efficient, and economical in construction for attaching spokes, reel-arms, spider-arms, and the like to hubs.

The invention consists, substantially, in the construction, combination, location, and arrangement, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation of a hub, showing one construction of means for attaching spokes, reel-arms, spider-arms, and the like thereto in accordance with the principles of my invention, the arms or spokes being broken off. Fig. 2 is a view in transverse section on the line 2 2, Fig. 1, looking in the direction of the arrows. Fig. 3 is a similar view on the line 3 3 of Fig. 1 looking in the direction of the arrows. Fig. 4 is a detached broken view in perspective of a hub end of a spoke or arm adapted for attachment to a hub in the manner shown in Figs. 1, 2, and 3. Fig. 5 is a view similar to Fig. 1, showing a modified arrangement of a construction embodying the principles of my invention. Fig. 6 is a detail view in section on the line 5 5 of Fig. 5 looking in the direction of the arrows. Fig. 7 is a similar view on the line 6 6, Fig. 5, looking in the direction of the arrows. Fig. 8 is a view similar to Fig. 2 on the line 7 7, Fig. 5, looking in the direction of the arrows. Fig. 9 is a view similar to Figs. 2 and 8, showing a slightly-modified arrangement of locking-tongue. Fig. 10 is a detail view in section on the line 9 9, Fig. 9, looking in the direction of the arrows. Fig. 11 is a similar view on the line 10 10, Fig. 9, looking in the direction of the arrows. Fig. 12 is a view similar to Fig. 4, showing a tubular form of spoke, spider or reel arm, or the like.

The same part is designated by the same reference-sign wherever it occurs throughout the several views.

In the drawings reference-sign A designates a hub, which may be of the usual or any well-known construction and arranged and mounted upon a shaft, rod, or axle B in the usual or any well-known manner. These parts being of the usual or any well-known construction or arrangement require no special description herein.

In carrying out my invention I propose to provide means whereby the spokes, reel-arms, spider-arms, or the like may be quickly applied or attached to the hub in a manner permitting of the removal thereof for repair when necessary and wherein such arms or spokes are efficiently locked in attaching relation with respect to the hub. These results may be accomplished in many specifically different ways. In the drawings I have shown several different ways in which the desired objects may be accomplished; but I desire it to be understood that my invention is not to be limited to the exact details of construction shown, as many other arrangements for accomplishing the same objects would readily occur to persons skilled in the art and still fall within the spirit and scope of my invention. In the form shown in Figs. 1, 2, 3, and 4 I mount a plate C upon the face of the hub A and provide said plate with radiating extensions D, having side flanges E, bent up to form channels or recesses. In practice I prefer to form said plate C of sheet metal and to slightly incline the upturned edges E of the extensions D thereof toward each other to form dovetailed channels, as most clearly shown in Fig. 3. As many of such channeled extensions may be provided as may be desirable to accommodate the required number of spokes or arms to be attached to the hub. With this form of fastening I employ a spoke, reel-arm, spider-arm, or the like (indicated at F) of channel shape in cross-section, as most clearly shown in Fig. 4, and also of sheet metal and with the side portions or flanges G thereof placed a distance apart normally to correspond substantially to the transverse width of the space between the flanges E of the channeled extensions D. From this description it will be understood that when the inner ends of the reel-arms or the like are telescoped or inserted endwise into the channeled sections a slight contraction or compression is exerted by the dovetailed cross-sectional shape of the channeled extensions upon the edges or side flanges G of the spokes or arms, tending to compress the same toward each other, as clearly illustrated in somewhat exaggerated condition in Figs. 1, 2, and 3. Adjacent to the inner ends of the spokes, reel-arms, or the like the flanges G are kerfed or split transversely, as clearly shown at H, (see Figs. 2 and 4,) thus forming spring lips or portions J at the extreme inner ends thereof, which when said inner ends of the spokes, arms, or the like are inserted a sufficient distance into, through, or upon the extensions D are thereby relieved of the compressing strain exerted upon the flanges G by the inner walls of the flanges E of said extensions, and hence are permitted to spring outwardly by their own resiliency and engage behind the inner ends of flanges E, as clearly shown in Fig. 1, thereby forming an automatic spring-lock, preventing the withdrawal of the spokes or arms without again forcibly compressing the spring lips or portions J sufficiently to enable the same to clear the end of the channeled section. By this construction it will be seen that I provide an exceedingly simple arrangement inexpensive in manufacture for attaching the spokes, spider-arms, reel-arms, or the like to the hub. It will also be seen that said spokes, arms, or the like are automatically locked in attached relation to the hub, but may be withdrawn therefrom for replacement or repair. It will also be seen that I am enabled to employ channeled spokes or arms struck or bent up out of sheet metal, thereby securing lightness, simplicity, and economy in construction without sacrificing anything of strength or rigidity.

It may sometimes be desirable to employ tubular-shaped spokes or arms. My invention, therefore, also includes the application of the principles above set forth to spokes or arms which are tubular or cylindrical in cross-section. Thus in Fig. 5 I have shown the plate C' provided with tubular or cylindrical extensions D', to which tubular or cylindrical shaped spokes or arms F' are attached. In order to form the automatic spring-lock for locking the tubular or cylindrical spokes, arms, or the like to the hub-plate, the extensions D' and the spokes, arms, or the like F' are provided with engaging spring-tongues and shoulders. It is obvious that the engaging shoulder may be formed on either the extension or the spoke or arm, and the coöperating spring-lip may be formed on the other of said parts. In the particular form shown, however, (see Figs. 5, 6, and 7,) the extensions D' are provided with openings K, and spring-tongues L are stamped or punched out of the spoke, arm, or the like, whereby when said spoke, arm, or the like and extensions are inserted the one within or upon the other said spring-lip will engage automatically behind the shoulder formed by the slot or opening K, thereby forming a lock for locking the spoke or arm to the extension.

The spoke, spider, reel-arm, or the like may be telescoped into the extension of the hub-plate, as shown in Fig. 1, or be telescoped upon the extension, as shown in Figs. 5 and 8. In Fig. 9 I have shown a construction wherein a tubular form $F^2$ of spoke or arm is employed and is telescoped into a tubular extension $D^2$ of the hub-plate $C^2$, the spoke or arm being transversely kerfed or slit for a portion of the circumference thereof, as indicated at M, to form spring-lips N, (see Figs. 9 and 12,) which when the ends of the spokes, arms, or the like are telescoped into the extensions $D^2$ spring out behind the inner ends of extensions $D^2$ in the same manner as above described, thereby forming an automatic spring-lock therefor. In the tubular form of spokes, reel or spider arms, or the like it is obvious that any particular arrangement of tubes may be employed. For economy of construction and for facilitating the attachment of said spokes or arms to the hub a split tubular construction such as is shown may be employed, it being understood that where the tube is to be telescoped upon the extension of the hub-plate the normal internal diameter of the tube should be slightly less than the external diameter of the extension, so as to secure the desired resiliency to enable the spring-lip portion to snap into place behind the shoulder or end of the extension. Similarly when the spoke or arm is to be telescoped into an extension the normal transverse area of said spoke or arm should be slightly greater than the transverse area of the extension for the same purpose. This is true whether the spoke or arm is of cylindrical or of any other transverse or cross-sectional area, and it is obvious that any desired cross-sectional shape or area of spoke or arm and hub extension may be employed without departure from the spirit or scope of my invention. It is also obvious that any desired construction of hub or hub-plate or hub or hub-plate extension may be employed and any suitable material may be employed in constructing or forming the hub or hub extensions or spokes or arms, but sheet metal forms a most convenient, simple, and economical material by reason of its natural resiliency and adaptability of being worked up into the desired shape.

While I have described my invention as applicable for attaching spokes, reel-arms, and spider-arms to hubs, it is obvious that the principles thereof may be applied to the attachment of any two parts. I do not desire, therefore, to be limited or confined to the purpose or use of my invention.

Having now set forth the object and nature of my invention and various constructions embodying the principles thereof and having explained and described such constructions, their purpose, function, and mode of operation, what I claim as new and useful and of my own invention, and desire to secure by Letters Patent of the United States, is—

1. The combination of a hub having a seat or socket and a spoke, reel-arm, spider-arm or the like, said seat or socket and spoke or arm adapted to be assembled in telescopic relation, one of said parts provided with a spring-lip and the other with a coöperating shoulder or abutment, whereby said parts are automatically locked and retained in assembled relation, as and for the purpose set forth.

2. The combination of a hub having a seat or socket and a spoke, reel-arm, spider-arm or the like, said seat or socket and spoke or arm being of differing cross-sectional area, one of said parts provided with a shoulder or abutment and the other with a spring-lip, whereby when said parts are assembled in telescopic relation they are automatically locked and retained, as and for the purpose set forth.

3. A hub having radial extensions, in combination with sheet-metal spokes, reel or spider arms, or the like, conforming in cross-sectional shape to the shape of said extensions, said spokes or arms and extensions arranged to be assembled in telescopic relation, one of said parts provided with a spring lip or portion and the other with a shoulder or abutment, whereby said parts are automatically locked and retained in assembled relation, as and for the purpose set forth.

4. The combination with a hub having a seat or socket, of a spoke, reel-arm, spider-arm or the like, formed of sheet metal and conforming in transverse shape to the shape of said seat or socket, said seat or socket and spoke or arm adapted to be assembled in telescopic relation, one of said parts provided with a transverse kerf or slit to form a spring-lip, said lip operating to engage the other of said parts when said parts are in assembled relation, to automatically lock the same together, as and for the purpose set forth.

5. The combination with a hub having a seat or socket, of a spoke, reel or spider arm, or the like, said seat or socket and reel-arm adapted to be assembled in telescopic relation, said spoke or arm provided with a spring-lip arranged to engage said seat or socket when said parts are assembled to automatically lock and retain the same in place, as and for the purpose set forth.

6. The combination with a hub having a channeled extension, of a channeled spoke, reel-arm, spider-arm or the like, said extension and spoke or arm adapted to be assembled in telescopic relation, one of said parts provided with a spring lip or portion arranged to engage the other of said parts to lock the same in assembled relation, as and for the purpose set forth.

7. The combination with a hub having a channeled extension, of a channel-shaped spoke, reel-arm, spider-arm or the like, said spoke or arm and extension adapted to be assembled in telescopic relation, said spoke or arm having transverse kerfs or slits in the side flanges thereof to form spring lips or portions arranged to engage said extension when these parts are in assembled relation, whereby said parts are automatically locked and retained in place, as and for the purpose set forth.

8. The combination with a hub having a dovetail-shaped channeled extension, of a correspondingly-shaped spoke, reel-arm, spider-arm or the like, arranged to be received endwise into said extension, the side flanges of said spoke or arm being transversely kerfed or slit to form spring-lips arranged to spring outwardly past the rear ends of said extension when said spokes or arms and extension occupy telescopic relation, as and for the purpose set forth.

In witness whereof I have hereunto set my hand, this 24th day of April, 1901, in the presence of the subscribing witnesses.

JAMES MACPHAIL.

Witnesses:
E. C. SEMPLE,
S. E. DARBY.